Jan. 9, 1951  E. N. GENOVESE  2,537,455
CAKE CUTTER

Filed June 18, 1948  2 Sheets-Sheet 1

INVENTOR.
EDGAR N. GENOVESE
BY Howard J. Whelan,
ATTORNEY

Jan. 9, 1951  E. N. GENOVESE  2,537,455
CAKE CUTTER
Filed June 18, 1948  2 Sheets-Sheet 2
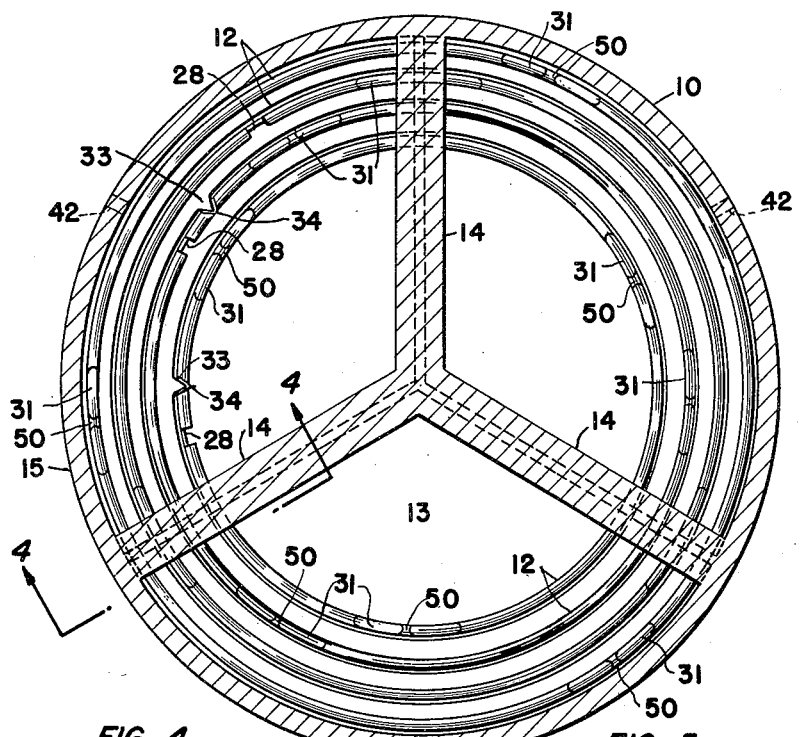
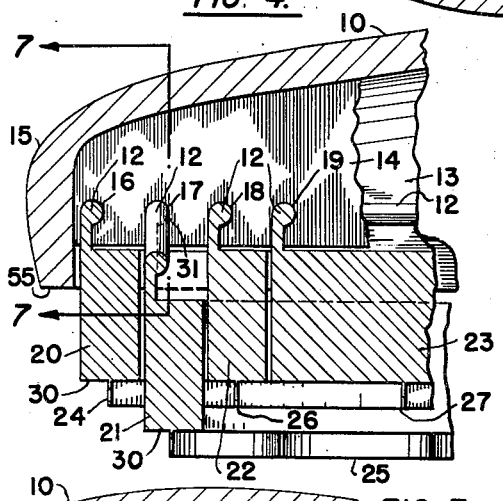
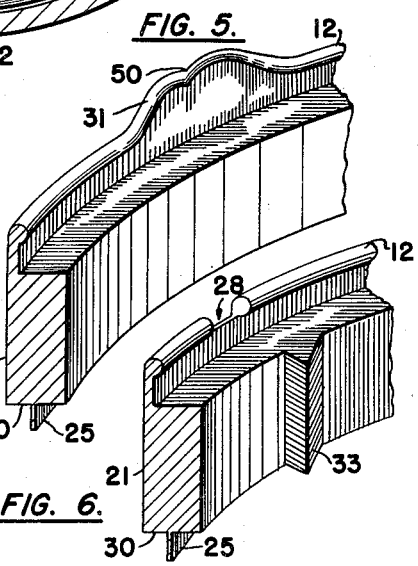
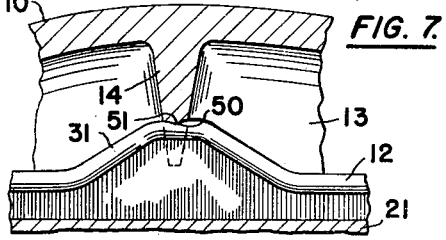
INVENTOR.
EDGAR N. GENOVESE
BY Howard J. Whelan.
ATTORNEY Patented Jan. 9, 1951

2,537,455

UNITED STATES PATENT OFFICE 2,537,455

CAKE CUTTER

Edgar N. Genovese, Baltimore, Md.

Application June 18, 1948, Serial No. 33,752

3 Claims. (Cl. 30—301)

This invention relates to dough cutters for the molding or cutting of same for making cookies ready to be cooked in a conventional oven. More particularly it pertains to a cutter unit of this nature that will be capable of providing an individual and selective design for the cookies by the manipulation of its parts so as to present the particular design of cutter selected to be used by the operator at the time.

While cutters have been used for this purpose heretofore, the conventional method is to provide a separate cutter for each design. This requires the use of as many different cutters as there are designs to be used, and these in turn take up considerable space, and are subject to loss or displacement when needed most, and their relative cost is high, when totaled up. The baker using them usually has his hands covered with dough materials and has to work in a limited area. This renders any extra work or parts detrimental to his operations and upsets his mental attitude to his work and the product resulting therefrom.

It is therefore an object of this invention to provide a new and improved cookie cutting device that will avoid one or more of the disadvantages and limitations of the prior art.

Another object of the present invention is to provide a new and improved cookie cutting device that will be capable of selectively arranging for the cutting of a number of designs independently by slight manipulation of its mechanism that may be conveniently accomplished, and be so provided therein as not to require additional parts for substitution, for the purpose, or their removal, in changing the design to be used at a particular moment.

Another object of the present invention is to provide a new and improved cookie cutting device comprising a plurality of cutters nested together in a slidable manner, but locked together against rotation; that are easily removable for cleaning; that can be raised or lowered in a selective manner.

Other objects will become apparent as the invention is more fully set forth.

In order to illustrate the invention, a particular form is outlined in this application by way of example. It is shown in the attached drawings and described in the following specification, while the scope of the invention is emphasized in the claims. This particular form serves to illustrate the principles and bring out the objects and uses of the device.

Referring to the drawings:

Figure 3 is a sectional view taken along line 3—3 of Figure 1, looking in the direction of the arrows;

Figure 4 is a partial sectional view taken on line 4—4 of Figure 3;

Figure 5 is a typical sectional detail in perspective of a cam-edge used on the cutter cylinders used in this embodiment;

Figure 6 is a typical sectional detail in perspective showing another portion of the cutter cylinders shown in Figure 5, to illustrate the cutter locking means and rim cut out; and Figure 7 is a sectional detail taken on line 7—7 of Figure 4.

Similar reference characters refer to similar parts throughout the drawings.

Figure 1:
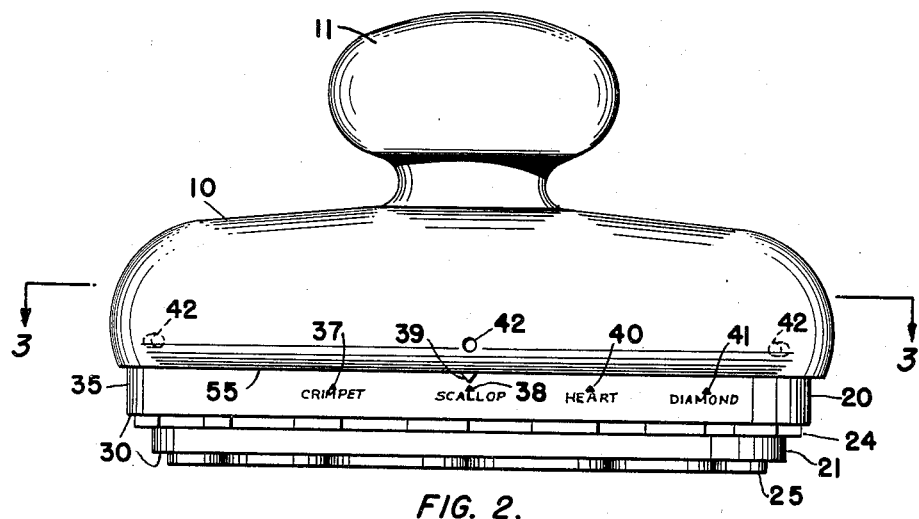
Figure 1 is a side elevation of a cutter unit embodying this invention, with one of the cutters lowered into cutting position.

In the particular form of cutter unit shown in the drawings, cylindrical head 10 is provided with a handle 11 at its top for its manipulation. The head has an interior chamber 13 crossed diagonally by trihedral partitions 14 serving to separate the chamber into three portions. The partitions 14 are not as deep as the peripheral wall 15 of the head 10 which has its lower surface 55 flat across in the same plane. The trihedral partitions are provided with grooves 16, 17, 18 and 19 respectively for supporting beaded rims 12 of the crimped, scallop, heart and diamond, cylindrical cutters 20, 21, 22 and 23. These cutters are arranged concentrically within the head 10 and have knives 24, 25, 26 and 27 arranged on their lower surfaces 30 and perpendicular thereto as to cut dough to the form of the selected cutter. The knives however do not cut together, but in individual sequence as will be explained. Only one knife cuts the dough at a time, when this device is used. The grooves 16, 17, 18 and 19 are made in the form shown in Fig. 4, to conform with the contour of the rims 12 projecting above the cutters 20, 21, 22 and 23, so the latter will be held within trihedral partitions 14 and be normally prevented from falling out of the head 10. However portions of the beaded rims 12 are removed or cut out at selected locations 28 to permit the cutters to be removed from the partitions 14 for cleaning and inspection or other designs may be used as replacements in the head. The cutters are moved up and down independently of each other in a convenient manner. The knives are located in the lower surfaces 30 of the cutters.

Figure 2:
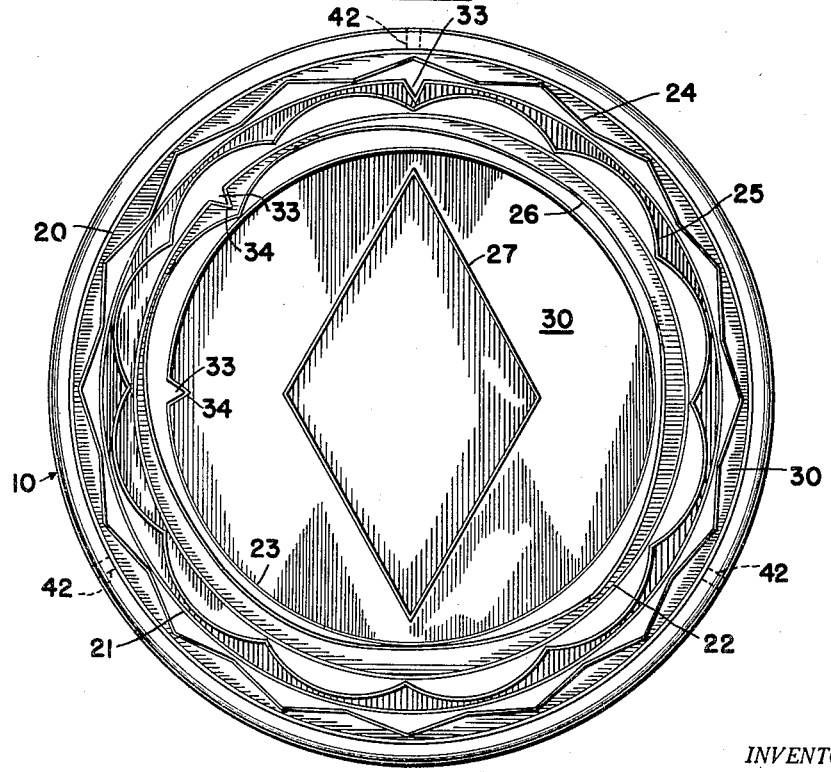
Figure 2 is an under view of Figure 1.

The beaded rims 12 are formed at particular portions to a cam-like contour 31 arranged to be positioned in the slots 16, 17, 18 and 19 in the trihedral partitions 14 when the head 10 is turned. As a particular cutter is brought into motion through the movement of its specific slot along the rim 12 until it reaches the cam 31 the cutter involved will be depressed and project beyond the edges of the other retracted cutters. The cam 31 is provided with an indentation 50 which becomes locked on the point 51 of the partitions 14 to hold the cutter being used against rotative movement. The cutters are moved into cutting position when the head 10 is rotated until the arrow head 39 is aligned with one of the pointers 37, 38, 40 or 41. The cutters are all arranged with a lock element 33 that fits in a corresponding recess 34 in the adjacent cutter, so when one cutter is moved downwardly through the action of the cam 31 within the slots in the tripod partitions 14, the other cutters remain in an upright or retracted position until their use is decided upon. The slots and the cams 31 are arranged for this purpose and cooperate with one another. This is accomplished by placing the cams 31 for each cutter in sequence so that when one cutter has made the necessary contact with its respective slot on its respective rim, the knife belonging to it will be in the projected plane. On further turning, this set of cams will be passed by the slots and the cutter raised back into the head. Then on further turning, the cam on another rim will be brought up to its respective partition and projected out to its cutting position. And the action is repeated for as many times as required. In order to make it easy for the operator to identify the positions for each alignment of the cutters and the head, the outside crimpet cutter 20 has its exposed peripheral surface 35 visible under the head 10, marked with the lettering 37, 38, 40 and 41 corresponding with the proper alignment of the arrow head 39 on the head 10. The scallop cutter 21 with its lettering 38 comes next; followed by the pointers 40 and 41 of the heart and diamond cutters respectively. The operation of the device is generally as follows; the operator holds the crimpet cutter 20 by the fingers of one hand, and turns the handle 11 with the other, which also turns the head 10 until, for example, the scallop lettering 38 is brought into alignment with the arrow head 39. This moves the trihedral partitions 14 until the grooves 17 in all of the three portions of the partitions 14 are engaged by the beaded rims 12 and passed through by them and the cam portion 31 of the rim comes into contact with the partitions 14 and forces the knife of the cutter 21 out into the cutting position. The other knives are not projected because their cutter cams and rims have not made contact with their partitions 14 on the underside of the head, to do so. After the knife of the scallop cutter 21 has done its work and another cutter is required, the same process is used to align and project the selected knife. When the cutters in each pair are properly aligned, the lock element 33 fits into a V-like recess 34 in the body of the corresponding cutter as indicated in Figure 2. The elements 33 and recess 34 act resiliently with regard to each other, to permit this to be done. The elements 33 and V-like recesses 34 keep the cutters in proper alignment with each other, and hold them against rotation. The rims in the grooves also holds the cutters in the trihedral partitions 14. The head 10 is also provided with holes 42 through its walls from the exterior to the chamber 13 whereby water may be introduced to the cutters or released therefrom, as may be desirable.

While but one form of the invention is indicated in the drawings it is not desired to limit this application for patent to this particular form, as it is appreciated that other forms could be developed and made that would embody the same principles and come within the scope of the appended claims.

Having thus described the invention, what is claimed is:

1. A dough cutter of the class described comprising in combination, a head including a chamber therein of bell-like form with a partition across it, said partition including grooves therein, a series of individual cutters having portions guided in said grooves and arranged concentrically about each other in the head and normally when not in use protruding co-extensively beyond the head, knives on each cutter having a different design thereon and with their edges normally co-extensive with one another, means on the cutters acting in conjunction with said partitions for changing the position of the cutters whereby one at a time will be projected into cutting position when the position of the head in relation thereto is revolved to a predetermined point, said means including slotted partitions and cams for reciprocating the cutters with knives thereof to individual cutting position during the movement of the cutters within the chamber.

2. A dough cutter of the class described comprising in combination, a head including a chamber therein of bell-like form with a partition across it, said partition including grooves therein, a series of individual cutters having portions guided in said grooves and arranged concentrically about each other in the head and normally when not in use protruding co-extensively beyond the head, knives on each cutter having a different design thereon and with their edges normally co-extensive with one another, means on the cutters acting in conjunction with said partitions for changing the position of the cutters whereby one at a time will be projected into cutting position when the position of the head in relation thereto is revolved to a predetermined point, said means including slotted partitions and cams for reciprocating the cutters with knives thereof to individual cutting position during the movement of the cutters within the chamber, and means for locking said cutters during each positioning thereof for individual cutting by the knives thereof.

3. A dough cutter of the class described comprising in combination, a head including a chamber therein of bell-like form with a partition across it, said partition including grooves therein, a series of individual cutters having portions guided in said grooves and arranged concentrically about each other in the head and normally when not in use protruding co-extensively beyond the head, knives on each cutter having a different design thereon and with their edges normally co-extensive with one another, means on the cutters acting in conjunction with said partitions for changing the position of the cutters whereby one at a time will be projected into cutting position when the position of the head in relation thereto is revolved to a predetermined point, said means including slotted partitions and cams for reciprocating the cutters with knives thereof to individual cutting position during the movement of the cutters within the chamber, means for locking said cutters during each positioning thereof for individual cutting by the knives thereof, said partition being a trihedral form with its grooves arranged as aforesaid for the holding of the cutters and in addition including a space in the grooves and rims for allowing the removal of each cutter from the head for inspection or cleaning purposes.

EDGAR N. GENOVESE.

REFERENCES CITED

The following references are of record in the file of this patent:

UNITED STATES PATENTS

| Number | Name | Date |
| --- | --- | --- |
| 915,611 | Lane | Mar. 16, 1909 |
| 1,446,513 | Morris | Feb. 17, 1923 |
| 2,119,260 | Valle | May 31, 1938 |